Aug. 20, 1946.                L. B. EATON                2,406,137
                              INFUSION BAG
                          Filed Oct. 18, 1944
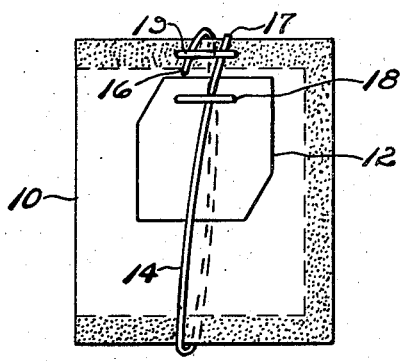
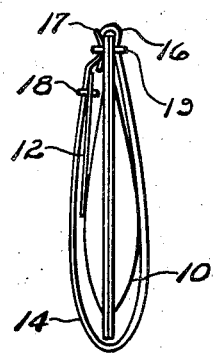
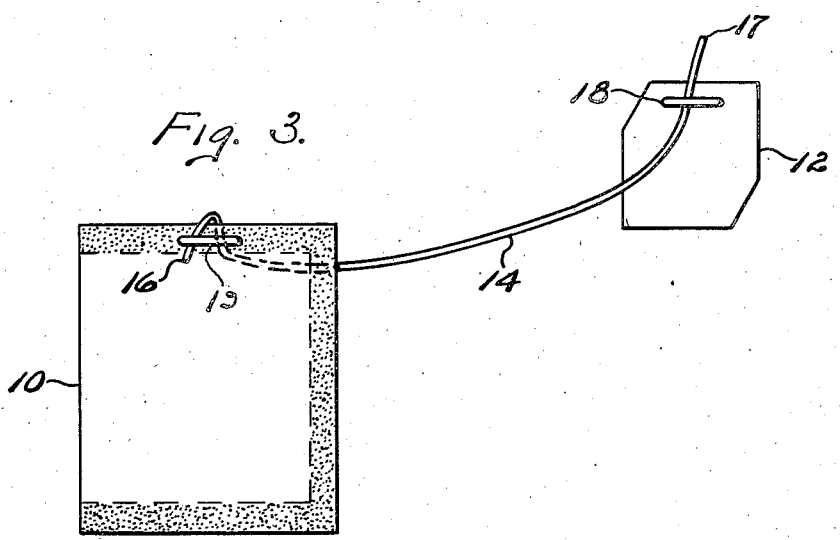
INVENTOR
LEWIS B. EATON
BY
J. Stanley Churchill
ATTORNEY Patented Aug. 20, 1946

2,406,137

UNITED STATES PATENT OFFICE 2,406,137

INFUSION BAG

Lewis B. Eaton, Quincy, Mass., assignor to Pneumatic Scale Corporation, Limited, Quincy, Mass., a corporation of Massachusetts Application October 18, 1944, Serial No. 559,161

2 Claims. (Cl. 99—77.1)

This invention relates to an infusion bag such as a tea bag.

The invention has for an object to provide a novel and improved infusion bag of the type having a handle comprising a tag and a length of twine connecting the tag and the bag in which provision is made for securing the normally extended handle in proximity to the bag in a manner such as to reduce to a minimum entanglement of adjacent handles of a group of bags packed together in a container.

With this general object in view, and such others as may hereinafter appear, the invention consists in the infusion bag hereinafter described and particularly defined in the claims at the end of this specification.

In the drawing illustrating the preferred embodiment of the invention, Fig. 1 is a front elevation of a tea bag embodying the present invention and showing the bag in condition for packing; Fig. 2 is a side elevation of the same; and Fig. 3 is a view showing the handle extended and the bag ready for use.

In general the present invention contemplates a novel infusion bag such as a tea bag, having the usual handle comprising a tag and a length of twine connecting the tag and the bag. In accordance with the present invention, the bag is attached to one end of the twine by a fastener and a short length of twine is extended beyond the connection to the tag, said extended end of twine being frictionally held under the bag fastener whereby to dispose the tag in proximity to the bag for packing purposes. In practice it is preferred to wind the twine about the bag before securing the extended end of the twine under the bag fastener and the tag is preferably disposed under the twine wound about the bag thus forming a compact bag unit capable of being packed together with similar bags with minimum liability of entanglement. When a bag is removed from the container for use, the handle may be released by merely withdrawing the extended end of the twine from under the bag fastener.

Referring now to the drawing, the invention is illustrated as embodied in a tea bag 10 of the envelope type formed by folding a rectangular blank of bag forming material and joining the edges thereof after depositing a quantity of tea between the folded edges of the bag forming material. As herein shown, the bag is provided with a handle comprising a tag 12 and a length of twine 14 connecting the tag and the bag, one end 16 of the length of twine being connected to the bag by a metal fastener 19 and the other end of the twine being connected to the tag by a metal fastener 18.

In order to dispose the twine and the tag in close proximity to the bag for the purpose specified, a short length of twine 17 is extended beyond the tag connection 18 and frictionally secured to the bag by the metal fastener 19 which also secured the end 16 of the twine to the bag as shown in Fig. 1.

In assembling the handle and the bag, after the tag 12 has been secured to one end of the twine with the portion 17 extending beyond the fastener 18, the other end 16 of the twine is placed adjacent one edge of the bag and the portion of the twine intermediate the ends thereof is then preferably extended over said edge and wound about the bag to present the end 17 adjacent the end 16 of the twine. The metal fastener 19 is then applied to simultaneously attach both ends of the twine to the bag. The tag is preferably disposed under the twine thus wound about the bag to render the tag less likely to become entangled with adjacent bag units.

As thus constructed it will be seen that the tag and the twine are positively attached in proximity to the bag thus reducing to a minimum liability of entanglement of adjacent handles of a group of bags packed together in a container. When a bag is removed from the container for use the end portion 17 may be withdrawn from under the fastener 19 to permit the intermediate portion of the twine to be extended in the usual manner as shown in Fig. 3.

While the preferred embodiment of the invention has been herein illustrated and described, it will be understood that the invention may be embodied in other forms within the scope of the following claims.

Having thus described the invention, what is claimed is:

1. An infusion bag comprising a flat pillow type bag having a handle comprising a tag and a length of twine connecting the tag and the bag of a length slightly greater than twice the length of the bag, said bag having a metal fastener connecting one end portion of the twine thereto, the portion of the twine intermediate the tag and the bag being wound about the bag and overlying the tag, the other end portion of the twine extending beyond the connection of the twine to the tag and being frictionally held under the aforesaid metal fastener of the bag whereby to dispose the tag and the twine in proximity to the bag for packing purposes and to enable said extended end portion of twine to be drawn from under the bag fastener to extend the intermediate portion of the twine when the bag is ready for use.

2. An infusion bag comprising a flat pillow type bag having a handle comprising a tag and a length of twine connecting the tag and the bag of a length slightly greater than twice the length of the bag, said bag having a metal fastener connecting one end portion of the twine thereto, the portion of the twine intermediate the tag and the bag being wound about the bag and overlying the tag, the other end portion of the twine extending beyond the connection of the twine to the tag and being frictionally held under the aforesaid metal fastener of the bag whereby to dispose the tag and the twine in proximity to the bag for packing purposes and to enable said extended end portion of twine to be drawn from under the bag fastener to extend the intermediate portion of the twine when the bag is ready for use, said tag being disposed under the twine wound about the bag.

LEWIS B. EATON.